July 19, 1938.   A. LEMIEUX   2,124,200
WORK HOLDER
Filed May 6, 1937
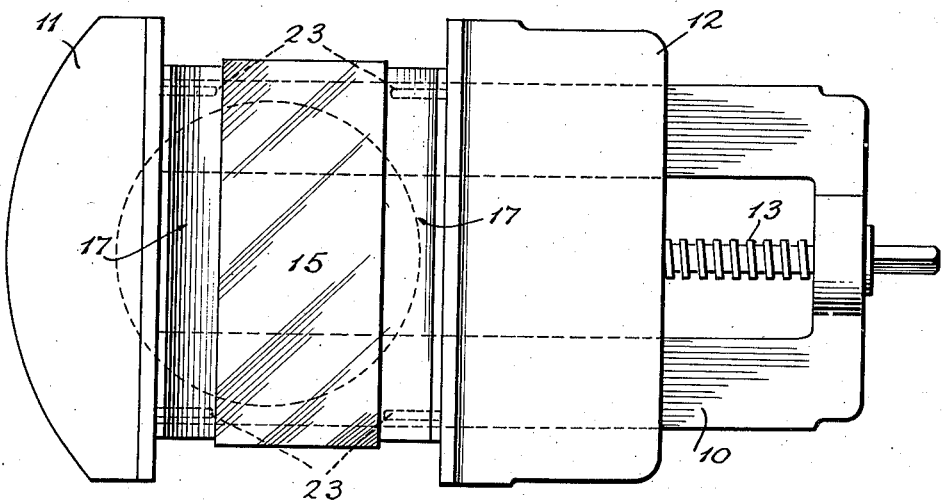
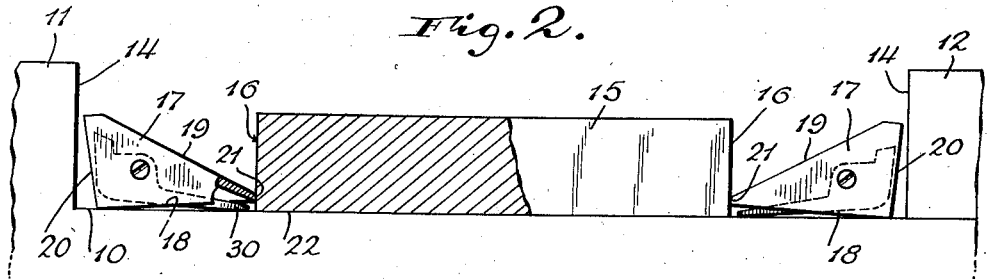
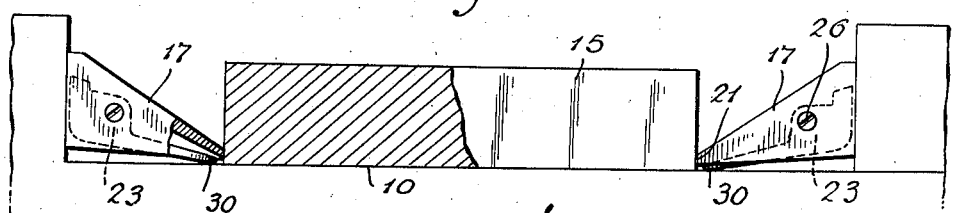
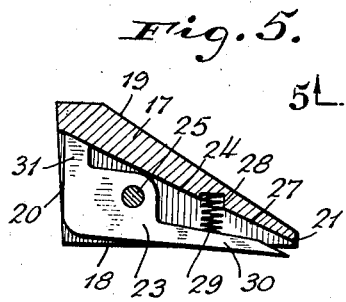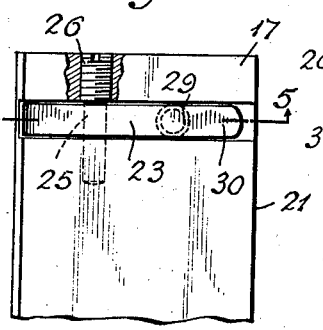
INVENTOR
ALBERT LEMIEUX
BY
*Mueller & Kahl*
ATTORNEYS Patented July 19, 1938

2,124,200

UNITED STATES PATENT OFFICE 2,124,200

WORK HOLDER

Albert Lemieux, New York, N. Y.

Application May 6, 1937, Serial No. 141,029

8 Claims. (Cl. 90—60)

This invention relates to improvements in work holders and has particular reference to a hold down device usually employed in metal working to retain a piece of work in position on a supporting surface of a vise which may be used when performing various operations upon the work, such as milling, planing and shaping the same.

Hold down devices have been suggested heretofore wherein the same have been mounted in the jaws of a vise, necessitating a special construction for said jaws. Also, there has been in common usage a hold down device of the general nature as that shown in the present disclosure and consisting of an elongated bar of substantial triangular cross section, with two of the converging surfaces forming a work-engaging edge adapted to grip the side of a piece of work when the bar is mounted between the latter and a jaw of a vise. When so mounted, and before the jaws of the vise are operated to clamp the work, the base of the bar rests entirely upon a supporting surface of the vise, with said edge of the bar contacting a side of the work at the junction of said side with the bottom surface of said work. The rear face of the bar, which is adapted to be engaged by a jaw of the vise, is pitched slightly to form an obtuse angle with the base thereof and thus inclined downwardly in diverging relation to the jaw surface with which it contacts during the clamping action and which is perpendicular to the supporting surface of the vise whereon the bar rests. Therefore, at the beginning of the clamping action, only the upper edge of the said rear face of the bar engages the vise jaw, and as said operation continues said jaw causes the bar to rock about its work-engaging edge as a fulcrum until said rear face lies flush against the surface of said jaw. The pressure of the jaw against the hold down bar and of the latter against the work is now, by reason of the inclination of the base of the bar relative to the supporting surface, in a downward and inward direction which is intended to force the work downwardly against the surface upon which the work is supported to thus clamp said work in position. However, it has actually been found in practice that, by reason of the fact that the base of the bar along the work-engaging edge is resting directly upon the supporting surface of the vise and said edge is contacting the side of the work at its junction with the bottom surface of the latter, the intended downward pressure of said bar against the work, as distinguished from the lateral or side pressure, is quite limited since said downward pressure of the work-engaging edge of the bar is exerted practically as much against the supporting surface upon which the bar rests as against the work itself. As a consequence, operators, in an attempt to secure a better hold down action, often will hammer upon the work or the bar with the result that sometimes a reversal of the desired effect will occur and the work will be forced upwardly from its supporting surface due to the severe lateral pressure thereon occasioned by the clamping action of the jaws of the vise.

The present invention is designed to overcome the above difficulty by the provision of a hold down device of simple and practical construction wherein its work-engaging edge is caused to be elevated above the supporting surface upon which said device rests before operating the jaws of the vise to effect the clamping action, so that when the latter step has been accomplished said device will assume a downwardly and inwardly inclined position with said edge engaging a side of the work along a line of contact spaced above the bottom surface thereof and remaining in such position during the clamping action, whereby the entire pressure of the vise jaws will be directed only against the work itself with the result that a substantial increase in the hold down action is effected.

The inventive idea involved is capable of receiving a variety of mechanical expressions some of which, for purposes of illustration, are shown in the accompanying drawing wherein:—

Figure 1 is a plan view of a vise, showing a pair of hold down devices in operative position therein and constructed in accordance with the present invention.

Figure 2 is a view, partly in section, showing the hold down devices in the positions they assume relative to a piece of work and to the surface of the vise upon which they are supported, before the jaws of the vise are operated to clamp the work.

Figure 3 is a view similar to Figure 2 showing the positions of the hold down devices after the work has been clamped.

Figure 4 is a fragmentary bottom plan view of one of the hold down devices.

Figure 5 is a transverse section therethrough substantially on the line 5—5 of Figure 4.

Figure 6 is a view similar to Figure 5 showing a slightly different form of hold down device.

The vise illustrated in Figure 1 is typical of the kind employed on shaping and other types of metal working machines and is shown herein merely as an example of one kind of vise with which the hold down device of the present invention may be employed. The vise is shown as comprising generally a work supporting surface 10 at one end of which there is disposed a fixed clamping jaw 11 with which cooperates a relatively movable jaw 12 adjustable toward and away from the jaw 11 by means of the screw shaft 13. Each of the jaws has a clamping face 14 disposed perpendicular to the supporting surface 10 and it is to be noted that a feature of the present invention resides in the fact that no special construction of the jaws is required when using the hold down device herein described. When mounting a piece of work 15 in the vise preparatory to clamping said work, the latter may be laid upon the supporting surface 10 in the position shown in Figure 2 with one of the hold down devices interposed between each side 16 of said work and the adjacent clamping jaw, with said device also resting upon said supporting surface; or said work 15 and/or said device may be supported upon parallels commonly used in metal working to properly position a piece of work with respect to the tools of a machine which are used to perform various operations upon the work. In such instances where parallels are used with the hold down devices, the same constitute the supporting surfaces for such devices.

The hold down device embodying characteristic features of the present invention is preferably in the form of an elongated bar 17 and may be made in different lengths depending upon the size of the work to be clamped. The bar 17 is made of any suitable metal and is of substantially triangular form in cross section so as to provide a base 18, an upper surface 19 and a rear face 20. The base 18 and surface 19 converge to form a work-engaging edge 21 which is adapted to contact a side 16 of a piece of work when the hold down device is in operative position. For a purpose which will appear in the course of the description, the rear face 20 of the bar is inclined slightly with respect to the base 18 so as to form an obtuse angle therewith and consequently be disposed in downwardly diverging relation to the face 14 of the adjacent clamping jaw.

In accordance with the present invention, means are provided for so supporting the bar 17 upon the surface 10 that the work-engaging edge 21 will be elevated above said surface and as a consequence will contact a side 16 of the work 15 at a point, or along a line, spaced from the bottom surface 22 of said piece of work, such engagement of the edge 21 with said work being effected both before and after the clamping action of the jaws 11, 12. As illustrated in Figure 5, said means is in the form of a lever 23 disposed within a tapered recess 24 formed in the bar 17 and communicating with the base 18. For convenience and more effective operation, the bar may be provided with one of the recesses 24 adjacent each end thereof as indicated in dotted lines in Figure 1, and one of the levers 23 is disposed in each of said recesses. To pivotally mount each lever intermediate its ends, a pin 25 is extended into a longitudinal opening formed in the adjacent end of the bar, the outer end of the opening being screw-threaded to receive the threaded head 26 of said pin so that the latter will be held in operative position. Between the pivot 25 and the work-engaging edge 21 the inner wall 27 of the recess 24 is provided with a socket 28 adapted to receive one end of a coil spring 29 the other end of which bears against the portion or arm 30 of the lever 23 so as to normally force said arm outwardly or downwardly beyond the plane or base 18, such outward movement of the lever being limited by contact of its other arm 31 with said wall 27. Thus, when the hold down device is placed upon its supporting surface, such as the surface 10, the free extremity of the arm 30 will engage said surface and, by reason of the spring 29, the work-engaging edge 21 will be elevated above said surface as illustrated in Figure 2, and the base 18 will consequently be disposed in an upwardly inclined position in the direction of the work 15 before the jaws 11, 12 are operated to clamp the work. When so disposed, on the supporting surface 10, the rear face 20 of each of the bars 17 is tilted or inclined toward the adjacent clamping jaw so that when the latter is operated to clamp the work its face 14 will first contact the upper edge of the face 20. The initial clamping action of the jaw against the bar 17 causes the edge 21 of the latter to clamp the side 16 of the work above its bottom 22 and thereafter said edge 21 acts as a fulcrum about which the bar 17 is bodily rocked until the same assumes the position in Figure 3 with the faces 14 and 20 in flush engagement. At the beginning of this rocking movement, the spring 29 is of sufficient tension to prevent excessive downward slipping of the edge 21 along the side 16 of the work so that said edge will not be forced all the way down against the supporting surface 10 before said edge securely grips the work. Thus, as shown in Figure 3, the edge 21 will still be elevated above the surface 10 and engage with the side 16 in spaced relation to the bottom 22 of the work, when the jaws 11, 12 have been completely operated. In connection with the rocking movement of the bar during the clamping action, the inclination of the face 20 with respect to the base 18 and also to the working face 14 of the clamping jaw, as previously referred to, is such that when the faces 14 and 20 are in complete contact with each other, as shown in Figure 3, the position or inclination of the base 18 relative to the supporting surface 10 will be reversed from that shown in Figure 2 and said base 18 will now be inclined downwardly and inwardly toward the work 15 with the result that the pressure exerted by the jaws 11, 12 will be in a similar direction and, by reason of the fact that the work-engaging edge 21 is not in contact with the supporting surface 10, the entire pressure of the hold down device against the work will be effective to hold the latter down against its supporting surface.

In the form of the invention shown in Figure 6, the bar 17 is provided with a recess 32 of uniform depth throughout and extending along the base of the bar from its rear face 20 to a point adjacent the work-engaging edge 21. Adjacent the face 20, one end of a leaf spring 33 is secured in the recess 32 by means of a suitable fastener 34, and the free end 35 of said spring is bowed so as to project below the base of the bar and thereby have the same effect as the free extremity of the arm 30 of the lever 23.

What is claimed is:

1. A hold down device comprising a bar having a base for mounting the device on a supporting surface in cooperative position to a piece of work to be held down on said surface by said device, said bar having a work-engaging edge, and means carried by said bar to maintain said edge in a raised position relative to said supporting surface so that said base will be inclined with respect thereto while being supported thereby.

2. A hold down device comprising a bar having a base for mounting the device on a supporting surface in cooperative position to a piece of work to be held down by said device, said bar having a work-engaging edge, and a spring pressed member mounted in said bar and extending from said base for contact with said supporting surface to elevate said edge thereabove when the latter is in contact with said work.

3. A hold down device comprising a bar having a base for mounting the device on a supporting surface in cooperative position to a piece of work to be held down by said device, said bar having a work-engaging edge, and means to maintain said edge in a raised position relative to said supporting surface so that said base will be inclined with respect thereto, said bar further having means to entirely elevate said base above said surface and reverse its inclination with respect thereto when the bar is clamped against said work.

4. A hold down device comprising a bar having a base for mounting the device on a supporting surface in cooperative position to a piece of work to be held down by said device, said bar having a work-engaging edge, and a spring pressed member extending from said base and contacting said supporting surface to elevate said edge thereabove when the latter is in contact with said work, said bar further having means operable, when the bar is clamped against said work, to raise said base entirely above said surface and incline the base downwardly from said means in the direction of said work.

5. A hold down device comprising a bar having a base for mounting the device on a supporting surface in cooperative position to a piece of work to be held down by said device, said bar having a work-engaging edge, a lever pivoted to said bar with one extremity thereof positioned adjacent said edge, and a spring acting to force said extremity downwardly beyond the plane of said base to elevate said edge above said supporting surface.

6. A hold down device comprising a bar having a base for mounting the device on a supporting surface in cooperative position to a piece of work to be held down by said device, said bar having a work-engaging edge, and further having a recess communicating with said base, a lever pivoted in said recess with one extremity thereof positioned adjacent said edge, and a spring in said recess bearing upon said lever to project said extremity beyond the plane of said base.

7. A hold down device comprising a bar having a base for mounting the device on a supporting surface in cooperative position to a piece of work to be held down by said device, said bar having a work-engaging edge, and further having a recess communicating with said base, and a spring secured in said recess and having a portion adjacent said edge projecting beyond the plane of said base for contact with said supporting surface.

8. In a work holder, the combination with a work-supporting surface and clamping jaws for said holder one of which is movable relative to the other; of a hold down device having a base engaging said surface and with respect to which the first named jaw is relatively movable for engagement with said device when the latter is in contact with a piece of work on said surface, said device further having a work-engaging edge, and means other than said base for elevating said edge above the plane of said surface for contact with a side of said work at a point spaced from the bottom thereof.

ALBERT LEMIEUX.